(12) United States Patent
Salovaara et al.

(10) Patent No.: US 8,599,529 B2
(45) Date of Patent: Dec. 3, 2013

(54) ACTIVE LIGHTNING PROTECTION

(75) Inventors: Kim Salovaara, Lidingö (SE); Michael Wiklund, Solna (SE)

(73) Assignee: P-Wave Holdings, LLC, Los Angeles, CA (US)

( * ) Notice: Subject to any disclaimer, the term of this patent is extended or adjusted under 35 U.S.C. 154(b) by 703 days.

(21) Appl. No.: 12/438,724

(22) PCT Filed: Aug. 22, 2007

(86) PCT No.: PCT/SE2007/000739
§ 371 (c)(1),
(2), (4) Date: Jul. 27, 2010

(87) PCT Pub. No.: WO2008/024047
PCT Pub. Date: Feb. 28, 2008

(65) Prior Publication Data
US 2010/0290169 A1     Nov. 18, 2010

(30) Foreign Application Priority Data

Aug. 25, 2006 (SE) .................................. 0601738

(51) Int. Cl.
*H02H 3/22* (2006.01)

(52) U.S. Cl.
USPC .......................................................... 361/120

(58) Field of Classification Search
USPC ................................................. 361/120, 119
See application file for complete search history.

(56) References Cited

U.S. PATENT DOCUMENTS

| | | | | | |
|---|---|---|---|---|---|
| 3,541,386 | A | * | 11/1970 | Ackermann | 315/151 |
| 3,632,285 | A | * | 1/1972 | Foster | 431/264 |
| 3,679,908 | A | * | 7/1972 | Mazza | 307/117 |
| 3,723,887 | A | * | 3/1973 | Panico | 327/374 |

(Continued)

FOREIGN PATENT DOCUMENTS

| | | |
|---|---|---|
| FR | 2544923 A1 | 10/1984 |
| GB | 1467318 A | 7/1974 |
| GB | 2166307 A | 10/1985 |

OTHER PUBLICATIONS

PCT International Search Report for International Application No. PCT/SE 2007/000739 dated Jun. 12, 2007.

*Primary Examiner* — Rexford Barnie
*Assistant Examiner* — Angela Brooks
(74) *Attorney, Agent, or Firm* — OC Patent Law Group; David L. Henty

(57) ABSTRACT

An improved device for over-voltage protection is disclosed. A triggerable three electrode GDT (Gas Discharge Tube) is in the device used for discharging voltage. The GDT is connected between an input of the device and ground, and has its trigger electrode connected to a secondary side of a transformer. The transformer is arranged for producing a trigger signal in response to a voltage on the input for triggering said GDT into a conducting state. According to the present invention, a primary side of the transformer is connected to the input via a capacitor and a resistance, wherein a current flowing from the input through said resistance charges said capacitor when the voltage on the input increases. A thyristor is connected to ground, from a point between the resistance and the capacitor. The thyristor is arranged to start conducting when the input voltage reaches a predetermined level, thereby discharging the capacitor through the thyristor to ground and creating a pulse on the primary side of the transformer. This pulse is then transformed into the trigger signal by the transformer.

15 Claims, 3 Drawing Sheets

(56) References Cited

U.S. PATENT DOCUMENTS

| | | | |
|---|---|---|---|
| 3,816,802 A | 6/1974 | Crask et al. | |
| 3,976,915 A * | 8/1976 | McConnell | 315/241 P |
| 4,012,667 A * | 3/1977 | Ishida et al. | 361/16 |
| 4,054,933 A * | 10/1977 | Praeg | 361/57 |
| 5,617,284 A * | 4/1997 | Paradise | 361/58 |
| 7,106,573 B2 * | 9/2006 | Kucharski | 361/119 |
| 2012/0268855 A1 * | 10/2012 | Chu et al. | 361/118 |

* cited by examiner

ACTIVE LIGHTNING PROTECTION

FIELD OF THE INVENTION

The present invention relates to a device for protecting electric circuitry against high input voltages.

The present invention also relates to a method for protecting electric circuitry against high input voltages.

The present invention also relates to a base station including a device for protecting electric circuitry against high input voltages.

The present invention also relates to a communication system including base stations including a device for protecting electric circuitry against high input voltages.

RELATED ART AND BACKGROUND OF THE INVENTION

Over-voltage protection devices can be used for protection of, for example, a TMA (Tower Mounted Amplifier) 102 mounted on a mast top of a BTS/Node B 101, as is shown in FIG. 1.

One type of such over-voltage protection devices is previously known from an over-voltage protection device as the one showed in FIG. 2.

In the background art protection device 200, shown in FIG. 2, a DC input 201 receives supply voltage for an electronic device being connected to the DC output 202 of the protection device 200. The electronic device connected to the DC output 202 can, for example, be a TMA. The background art protection device 200 has further a resistance 204 connected between the conductors of the DC input 201 and the DC output 202. This resistance should have quite low resistance, for instance 1Ω.

The background art protection device shown in FIG. 2 further includes a two electrode GDT (Gas Discharge Tube) 203 connected between the conductor of the DC input 201 and ground for primary surge protection. A GDT has very high impedance under normal operating conditions, in the order of 1 TΩ in parallel with 1 pF, or less. When the voltage rises to a predetermined value, an actuation voltage, the impedance drops abruptly and a current starts to flow through the gas of the GDT. Increasing currents causes the gas to form a plasma, causing the voltage across the GDT to drop further, to around 15 V. The plasma extinguishes itself when the current through the GDT decreases.

A transorb diode 205, constituting a secondary surge protection, is connected between the conductor of the DC output 202 and ground. The transorb diode 205 is non-conducting (reverse-biased) during normal conditions and is conducting (forward-biased) when a voltage on the conductor of the DC output 202 rises over a predetermined value. The transorb diode 205 takes care of transient voltage peaks appearing on the conductor of the DC output. The secondary surge protection may also include a number of transorb diodes and resistances connected in series between the DC output 202 and ground.

The combination of a primary and a secondary surge protection is commonly used in over-voltage protection devices. The reason for this is that the different circuits used for primary and secondary surge protection, the GDT and the transorb diode, have different advantages. The GDT used for primary protection can handle very high currents, but is not very fast. The transorb diode used for secondary protection is very fast, but can not handle very high currents. By combining the high current and relatively slow GDT with the faster and lower current transorb diode, the advantages of both these circuits can be combined and results in a good total protection characteristic.

The background art protection system relies on the GDT of the primary surge protection to handle the main part of the current, by letting the current flow through the gas of the GDT, when a strike of lightning causes the voltage over the GDT to rise enough for the GDT to start conducting.

However, there is a problem in background lightning protection devices, such as the one shown in FIG. 2, regarding the function of the GDT. GDTs are manufactured to have a specified actuation voltage, for which voltage the GDT should start conducting. In practical use, however, the actual actuating voltage needed to trigger the GDT depends on the shape of the over-voltage pulse appearing at the DC input 201 of the device. It is not at all sure that the GDT starts conducting when it is supposed to. There is thus a risk that the GDT starts to conduct very late, when the voltage has already reached a much higher value than the specified actuation voltage value.

This late actuation can have the effect that a much bigger part of the lightning energy than the transorb diode has been designed for reaches the secondary surge protection. The secondary surge protection may not be able to handle this energy and the circuits meant to be protected might therefore be in danger.

Background art solutions have been presented that aim to solve this problem. Such background art solutions are shown by GB 2 166 307 A and FR 2 544 923 A1. These solutions utilize a triggering function of a voltage arrester in order to trigger the voltage arrester to start conducting.

The basic idea of these background art solutions is to let a transformer create a voltage, by transforming a voltage present on the input of the protection device, and to use this created voltage for triggering the voltage arrester into a conducting state. These solutions make great demands on the characteristics of the transformers. They have to have a low permeability (μ) core and a high number of windings. There is further a risk that the iron core of transformer might be saturated.

Background art document GB 1 467 318 shows further a semiconductor converter device, in which a surge arrester is triggered by a pulse created by discharging a capacitor. When creating the triggering pulse in a controlled manner, as is shown in this background art solution, the requirements of the transformer can be lowered.

However, the creation of the triggering pulse according to this background art solution is very complex. A large number of circuitry is here needed for creating the triggering pulse, including a number of DC voltage sources, that might have to be substituted when they have to be charged or when they are out of order. Substituting such DC voltage sources might take some time to do and during this time the surge protection does not work, resulting in a protection hazard, if over-voltage would occur during this time.

Also, over-voltage protection devices may be located in a mast top in the wilderness, and to perform service at such location can be both time consuming and expensive. As is well known, complex devices are more likely to need service than simple and robust devices, and the complex background art solutions are therefore prone to errors that need service.

Thus, in background art over-voltage protection devices, there exist problems relating to strict demands on transformers used and also problems relating to operation and complexity of the devices. These problems further lead to expensive over-voltage protection.

AIM AND MOST IMPORTANT FEATURES OF THE INVENTION

It is an object of the present invention to provide a device and a method for protecting electric circuitry against high input voltages that solves the above stated problems.

A further object of the present invention is to provide a base station including said device.

A still further object of the present invention is to provide a communication system including the base station.

The present invention aims to provide a less complex, less expensive and more robust over-voltage protection than the protection systems known in the background art.

The object is achieved by an over-voltage protection device according to the present invention.

The object is also achieved by an over-voltage protection method according to the present invention.

According to an embodiment of the present invention, a three electrode GDT in an over-voltage protection device is, by a trigger signal created by a transformer, triggered into a conducting state. The transformer creates the trigger signal by transforming a pulse created when a capacitor is discharged to ground as the input voltage reaches a predetermined level.

The capacitor is charged by the voltage present at the input, using a current flowing from the input, through a resistance to the capacitor for charging the capacitor.

The capacitor is discharged when a thyristor, connected to ground from a point between the resistance and the capacitor, starts conducting. The thyristor is arranged to start conducting when the input voltage reaches a certain level.

Thereby, the capacitor is discharged through the thyristor to ground, when the input voltage of the over-voltage protection device reaches a certain level. By this, a pulse is created which is fed to the transformer. The transformer transforms the pulse into a trigger signal, which is then applied to the triggering electrode of the three electrode GDT. This causes the three electrode GDT to start conducting.

The embodiment of the present invention thus uses very few components to, in a robust way trigger the three electrode GDT, which offers a low complex over-voltage protection device that results in a good protection of the electronic circuitry being protected by the device.

The capacitor is, according to the invention charged by the voltage on the input of the device, thereby eliminating the background art need for extra DC voltage supplies for charging capacitors. The discharge of the capacitor is further efficiently controlled by the use of very few electronic circuits.

Further, by the construction of the over-voltage protection in accordance with the embodiment of the present invention, the requirements of the different components included in the protection device can be made less strict. That is, the demands on exactness of the transformator, the GDT and the secondary surge protection transorb diode are much lower than in prior art solutions. Thereby, a small number of relatively cheap components can be used for the over-voltage protection device, which is, of course, very advantageous.

In an embodiment of the present invention, the thyristor is controlled by a control voltage being applied on its gate. In this embodiment, a Zener diode and a resistance are coupled in series between the conductor of the DC input and ground. A point between the Zener diode and the resistance is connected to the gate of the thyristor. Thereby, the voltage over the Zener diode is used for controlling the thyristor. When this voltage increases above the Zener voltage of the Zener diode, the capacitor is discharged and the triggering signal is created. The Zener voltage of the Zener diode thus determines the voltage for which the trigger signal is to be created. This trigger signal creation voltage can easily be changed just by changing the Zener diode.

This embodiment offers a simple and low complex control of the voltage for which the three electrode GDT should be triggered.

DETAILED DESCRIPTION OF PREFERRED EMBODIMENTS

According to the present invention, a three electrode GDT in an over-voltage protection device is triggered into a conducting state by a trigger pulse being created by a transformer. The transformer is fed with a pulse created by discharging a capacitor to ground when the input voltage reaches a predetermined level. The capacitor is, according to the present invention, charged by the voltage present at the input, using a current flowing from the input, through a resistance to the capacitor for charging the capacitor.

The capacitor is discharged when a thyristor, connected to ground from a point between the resistance and the capacitor, starts conducting. The thyristor is arranged to start conducting when the input voltage reaches a certain level. Thus, when the input voltage of the over-voltage protection device reaches a certain level, the capacitor is discharged through the thyristor to ground, thereby creating a pulse being fed to the transformer, which transforms the pulse into a trigger pulse. The trigger pulse is then applied to the triggering electrode of the three electrode GDT, which causes the three electrode GDT to start conducting when the capacitor discharges. The triggering electrode may be the centre electrode of the three electrode GDT.

The present invention thus offers a low complex and robust over-voltage protection device, which results in a safe protection of electronic circuitry being protected by the device.

Low complexity is, according to the present invention, achieved by creating the trigger pulse by the use of a small number of electronic circuits. The capacitor is charged by the voltage on the input of the device, eliminating the background art need for DC voltage supplies for charging capacitors. The discharge of the capacitor is further efficiently controlled by the use of very few electronic circuits.

Figure 1:
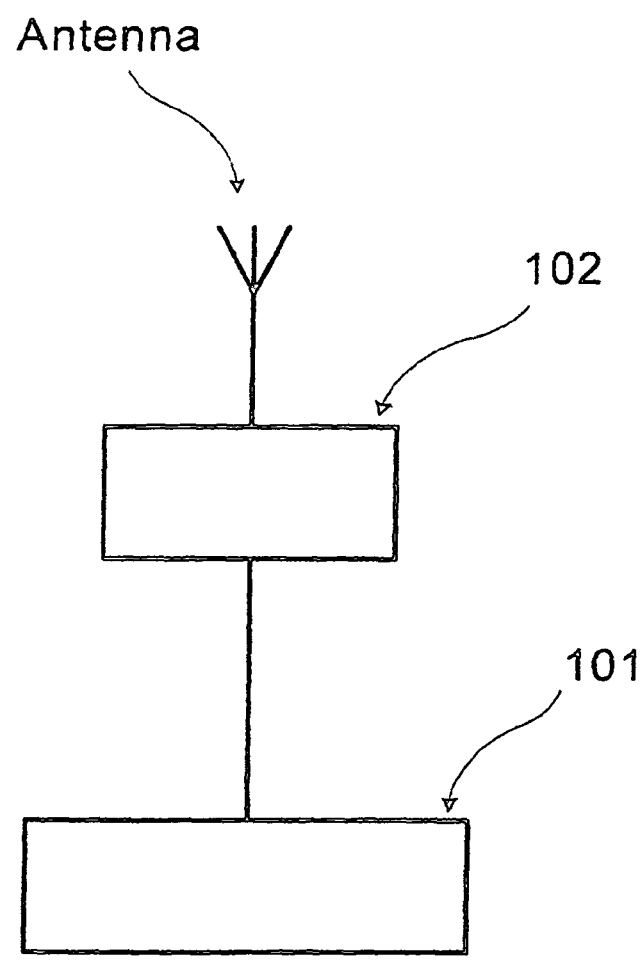
FIG. 1 shows a BTS/Node B.
Figure 2:
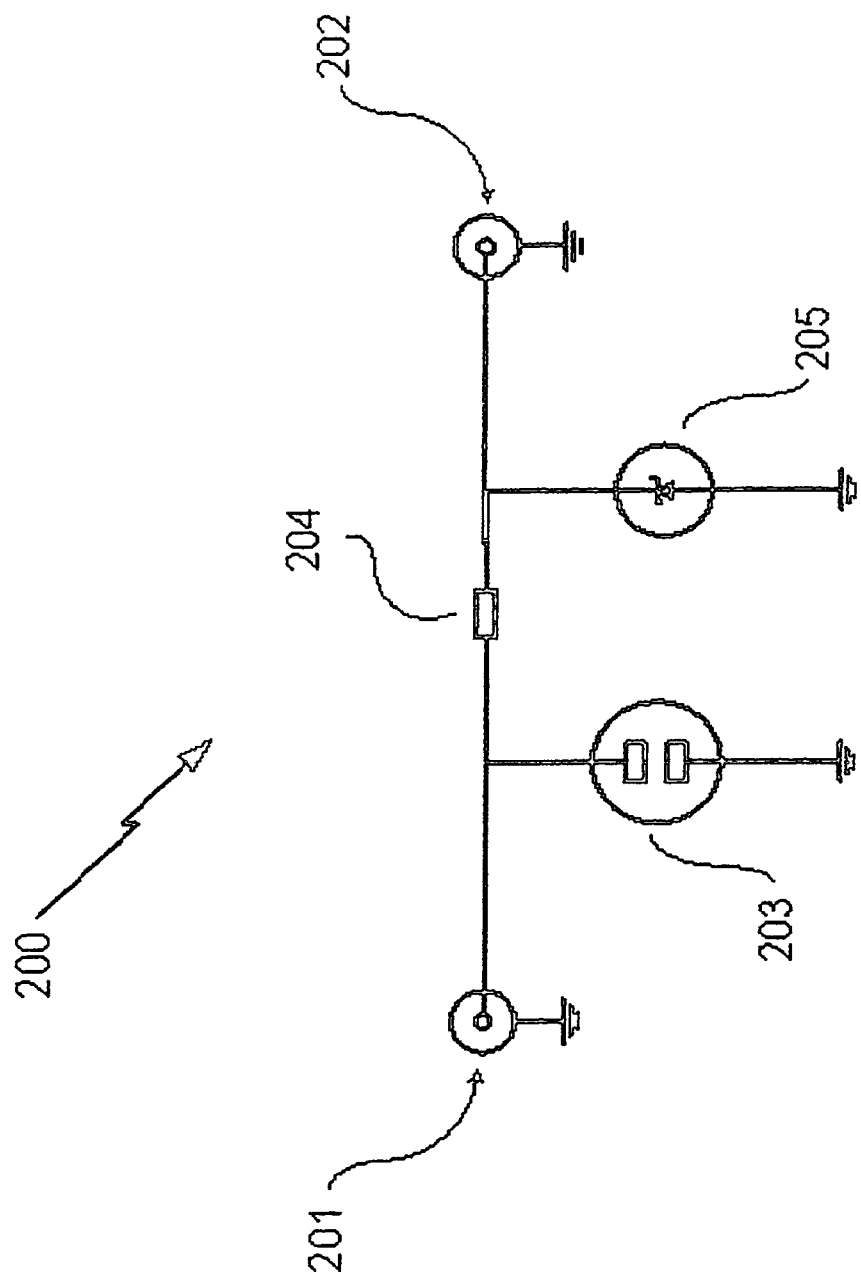
FIG. 2 shows a background art device for protection against high voltages.
Figure 3:
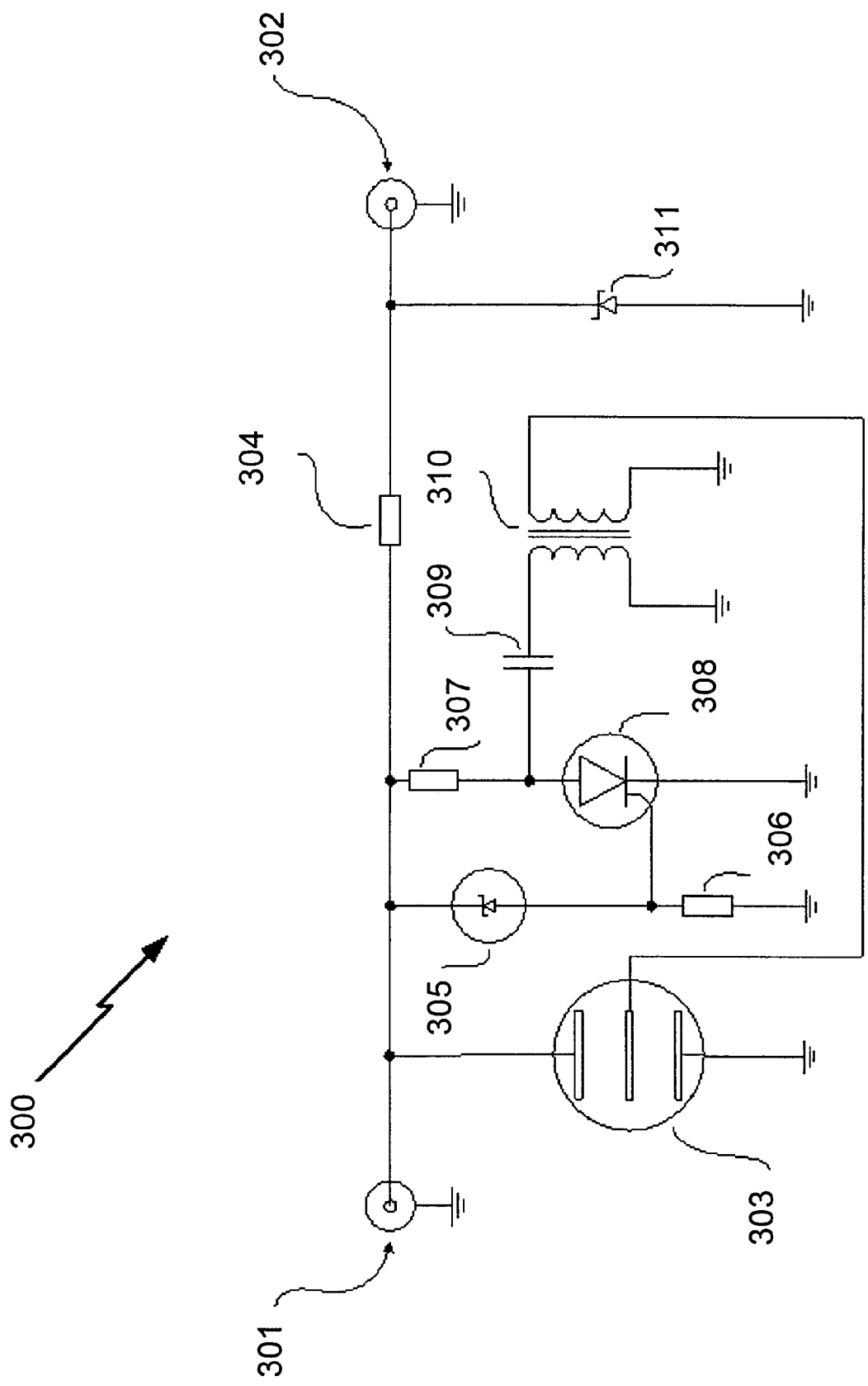
FIG. 3 shows a device for protection against high voltages according to an embodiment of the invention.

FIG. 3 shows an over-voltage protection device 300 according to an embodiment of the invention. The over-voltage protection device has a DC input 301 receiving supply voltage for an electronic device being connected to the DC output 302 of the device. The over-voltage protection device 300 has a resistance 304 connected between the conductor of the DC input 301 and the conductor of the DC output 302.

A three electrode GDT 303 forms a primary surge protection according to the present invention. The three electrode GDT is connected between the conductor of the DC input 301 and ground, and a trigger electrode of the three electrode GDT is connected to a secondary side of a transformer 310. The primary side of the transformer 310 is connected to the conductor of the DC input 301 via a capacitor 309 and a resistance 307.

A transorb diode 311, constituting a secondary surge protection, is connected between the conductor of the DC output 302 and ground.

A thyristor 308 is connected to ground from a point between the capacitor 309 and the resistance 307. The thyristor 308 has the function of a switch and is controlled by a voltage being applied to its gate. Thus, when a suitable voltage is applied to the gate of the thyristor 308, it starts to conduct and the capacitor 309 is discharged to ground through the thyristor 308

FIG. 3 shows one possible implementation for creation of a control voltage to be applied to the gate of the thyristor 308. According to this way of creating the control voltage, a Zener diode 305 and a resistance 306 are coupled in series between the conductor of the DC input 301 and ground. A point between the Zener diode 305 and the resistance 306 is connected to the gate of the thyristor 308, thereby applying a possible potential voltage over the resistance 306 to the gate. A skilled person realizes that such a control voltage used for controlling the thyristor 308 can be created in a number of ways. However, in order to keep the complexity of the overvoltage protection device low, these possible implementations should include relatively few components.

The protection device according to the embodiment of the present invention shown in FIG. 3 has thus circuitry for creating a trigger signal for the three electrode GDT 303, the trigger signal creating circuitry consisting only of the components 305-310. The low complexity creation of this trigger signal, being performed this trigger signal creating circuitry, is hereafter described.

When the voltage on the DC input 301 increases, the capacitor 309 is charged by a current flowing through resistance 307 to capacitor 309. When the voltage on the DC input 301 increases above a Zener voltage of the Zener diode 305, the Zener diode 305 starts to let current flow through the Zener diode 305 and further through a resistance 306 to ground. The current flowing through resistance 306 builds up a potential voltage over the resistance 306. This potential voltage is applied to a gate of a thyristor 308. The thyristor 308 acts like a switch and starts conducting when this potential voltage is applied to its gate.

When the thyristor 308 starts to conduct, the charge that has been built up in capacitor 309 is discharged and can flow to ground. This creates a pulse in a circuit consisting of the thyristor 308, the capacitor 309 and the primary side of the transformer 310. This pulse is transformed by the transformer 310 into a trigger signal, which is applied to the centre electrode (trigger electrode) of the three electrode GDT 303. By applying this trigger signal to the trigger electrode of the three electrode GDT, the three electrode GDT is forced into a conducting state and the over-voltage present on the DC input 301 is taken care of by the three electrode GDT 303.

If another way of creating the control voltage controlling the thyristor 308 is used, such a creation should have the feature that it applies a voltage on the gate of the thyristor 308 when the voltage on the DC input 301 is too high. This applied voltage should be suitable for controlling the thyristor 308 into a conducting state. Essentially any combination of components performing such a control of the thyristor 308 may be used, as is clear for a person skilled in the art.

The implementation of the over-voltage device according to the present invention can, as was described above, be performed by the use of a small number of components. This is possible because of the simple construction of the device, where the voltage on the DC input 301 is used for charging the capacitor 309 and where the discharge of the capacitor can be performed by a small circuitry, consisting of only a few components. By this construction, there is no longer a need for extra power sources for charging the capacitors and there is also no need for complex circuitry for triggering discharge of the capacitor.

The transformer 310 may be a 1:N step-up transformer, having primary and secondary sides with primary and secondary windings, where N may be, for instance, between 5 and 10. However, a skilled person realises that essentially any suitable kind of transformer can used for this purpose. The Zener diode 305 may be chosen such that the Zener voltage of the Zener diode 305 has a suitable value, for instance 45 V or the like.

According to an embodiment of the invention, the resistance 304 is replaced by an inductor.

By, according to the present invention, controlling the function of a three electrode GDT 303, by applying a voltage on its centre electrode, a better and more reliable surge protection is provided. The problems regarding late actuation of the non-triggered GDTs in the background art solutions, where input voltages of around 200 V are often needed to actuate the GDTs, are solved. Also, the demands on exactness of the GDT actuation voltages are much lower than they were in background art solutions. This makes it possible to use less expensive GDTs.

According to the present invention, all voltages above a predetermined voltage level, which can be set easily, are enough for triggering the three electrode GDT 303 into a conducting state. Also, since only the value of the voltages present on the input of the device matters, the protection device 300 according to the present invention works well for over-voltage protection regardless of the shape of the voltage on the DC input 301. The input voltage 301 signal can have any kind of differential coefficient. The voltage can, for instance, be a DC voltage or a transient. The only thing that matters for the creation of the triggering signal is thus the level of the voltage of the DC input 301, on which the control of the thyristor 308 is based.

For example, when the implementation shown in FIG. 3 is used, the voltage over the Zener diode 305 is important for the control of the thyristor 308. When this voltage, regardless of the shape of the input voltage, increases above the Zener voltage of the Zener diode 305, the capacitor 309 is discharged and the triggering signal is created. The invention according to this embodiment can thus protect against all sorts of over-voltage. The Zener voltage of the Zener diode 309 does thus here determine the voltage for which the trigger signal is to be created. This trigger signal creation voltage can easily be changed just by changing the Zener diode 309. For other implementations for control of thyristor 308, corresponding voltages and values for corresponding components used in such other implementations will have corresponding functions.

Further, the demands on the secondary surge protection circuits do not have to be very strict, since the primary surge protection is very robust. A low-cost transorb diode 311 and a low cost resistance 304 can therefore be used in a protection device according to the present invention.

Also, the transformer 310 is according to the present invention is not directly connected to the conductor of the DC input 301. This has the advantage that the transformer does not have to cope with high currents that can appear on the conductor due to lightning strikes and the like. The characteristics of the transformer 310 are therefore not that crucial. According to the present invention, the pulse fed to the transformer 310 can be designed by choosing components creating the pulse, such that a pulse having a suitable shape is created and fed to the transformer for transformation. By this a less expensive transformer can be used.

A device and method for protecting electric circuitry against high input voltages according to the invention may be modified by those skilled in the art, as compared to the exemplary embodiments described above.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A device for protecting electric circuitry against high input voltages, said device including a Gas Discharge Tube (GDT) for discharging high currents, said GDT being connected between an input of said device and ground, and being provided with a trigger electrode connected to a secondary side of a transformer, said transformer being arranged for producing a trigger signal in response to a voltage on said input for triggering said GDT into a conducting state wherein,
a primary side of said transformer is connected to said input via a capacitor and a resistance, wherein a current flowing from said input through said resistance charges said capacitor, when said voltage on said input increases, and further comprising:
a thyristor connected to ground, from a point between said resistance and said capacitor, said thyristor being arranged to start conducting when said input voltage reaches a predetermined level exceeding the normal operating voltage level, thereby discharging said capacitor through said thyristor to ground and creating a pulse on said primary side of said transformer, said pulse being transformed into said trigger signal by said transformer.

2. The device claimed in claim 1, wherein said primary and secondary sides of said transformer have primary and secondary windings.

3. The device claimed in claim 1, wherein said trigger electrode is a centre electrode of three electrodes of said GDT.

4. The device claimed in claim 1, wherein said device includes a transorb diode connected between an output of said device and ground, as a secondary protection against high input voltages.

5. The device claimed in claim 1, wherein said predetermined level is controlled by a Zener diode coupling, having a Zener diode and a resistance coupled between said input and ground, the electric potential over said resistance being arranged to control said thyristor such that said thyristor starts to conduct when the input voltage increases over a Zener voltage of said Zener diode, thereby discharging said capacitor and creating a pulse.

6. The device claimed in claim 5, wherein said Zener voltage of said Zener diode determines at which input voltage the pulse is to be created.

7. The device claimed in claim 1, wherein said device includes a resistance connected between the conductors of said input and an output of the device.

8. The device claimed in claim 1, wherein said device includes an inductor connected between the conductors of said input and an output of the device.

9. The device claimed in claim 1, wherein said device is coupled to electric circuitry in an antenna mast top.

10. A base station including a device defined in claim 1.

11. A communication system including base stations including a device defined in claim 1.

12. A method for protecting electric circuitry against high input voltages, said method including the use of a Gas Discharge Tube (GDT) for discharging high currents, said GDT being connected between an input of said device and ground, and being provided with a trigger electrode connected to a secondary side of a transformer, said transformer producing a trigger signal in response to a voltage on said input for triggering said GDT into a conducting state the method comprising the steps of:
charging a capacitor, connecting a primary side of said transformer to said input via a resistance, when said voltage on said input increases, by a current flowing from said input through said resistance, and
discharging said capacitor through a thyristor to ground, said thyristor being connected to ground from a point between said resistance and said capacitor, said thyristor starting to conduct when said input voltage reaches a predetermined level exceeding the normal operating voltage level, the discharge creating a pulse on said primary side of said transformer, said pulse being transformed into said trigger signal by said transformer.

13. The method claimed in claim 12, wherein said predetermined level is controlled by a Zener diode coupling, having a Zener diode and a resistance coupled between said input and ground, the electric potential over said resistance controlling said thyristor such that said thyristor starts to conduct when the input voltage increases over a Zener voltage of said Zener diode, thereby discharging said capacitor and creating a pulse.

14. The method claimed in claim 13, wherein said Zener voltage of said Zener diode determines at which input voltage the pulse is to be created.

15. The method claimed in claim 14, wherein said trigger electrode is a centre electrode of three electrodes of said GDT.

* * * * *